United States Patent [19]

Heidel et al.

[11] Patent Number: 5,574,120
[45] Date of Patent: Nov. 12, 1996

[54] PROCESS FOR THE PREPARATION OF DICARBOXYLIC ACID TERPOLYMERS FOR DETERGENTS AND CLEANING AGENTS

[75] Inventors: Klaus Heidel, Marl; Wulf Ruback, Dülmen; Frank Krause, Kleve, all of Germany

[73] Assignee: Chemische Fabrik Stockhausen GmbH, Krefeld, Germany

[21] Appl. No.: 554,348

[22] Filed: Nov. 6, 1995

[30] Foreign Application Priority Data

Nov. 9, 1994 [DE] Germany ............... 44 39 978.2

[51] Int. Cl.⁶ ............. C08F 22/02; C08F 22/26; C08F 22/06; C11D 3/37
[52] U.S. Cl. ............. 526/318.2; 526/87; 526/89; 526/318.4; 526/319; 526/330; 526/911
[58] Field of Search .............. 526/318.2, 318.4, 526/330

[56] References Cited

U.S. PATENT DOCUMENTS 3,887,480  6/1975  Rue ........................... 252/135
4,647,396  3/1987  Denzinger .................. 252/174.24

FOREIGN PATENT DOCUMENTS 0 497 611 A1  8/1992  European Pat. Off. .

*Primary Examiner*—Fred Zitomer
*Attorney, Agent, or Firm*—Oblon, Spivak, McClelland, Maier & Neustadt, P.C.

[57] ABSTRACT

The preparation of terpolymers by free radical polymerization of an unsaturated dicarboxylic acid with an unsaturated monocarxylic acid and a further saturated monomer which contains no free carboxyl groups, in an aqueous medium, is carried out, according to the invention, in the presence of surfactant compounds.

10 Claims, No Drawings

PROCESS FOR THE PREPARATION OF DICARBOXYLIC ACID TERPOLYMERS FOR DETERGENTS AND CLEANING AGENTS

The invention relates to an improved process for the preparation of terpolymers of a) a monoethylenically unsaturated $C_4$- to $C_6$-dicarboxylic acid,
b) a monoethylenically unsaturated $C_3$- to $C_5$-monocarboxylic acid and
c) an olefinically unsaturated monomer containing no free carboxyl groups by free radical copolymerization in an aqueous medium.

Some terpolymers containing carboxyl groups have good biodegradability and are used as greying-inhibiting and scale-inhibiting additives in phosphate-free and low-phosphate detergents and cleaning agents. The detergents and cleaning agents which contain less than 25 percent by weight of sodium phosphate are low-phosphate.

The phosphate-free or low-phosphate products introduced in the market are in particular those which, in addition to surfactants, contain water-insoluble ion exchangers based on zeolite or sheet silicate as so-called builders. However, since these silicates, owing to their specific properties, cannot alone replace the phosphates as builders, they are supported in their action by water-soluble additives, which are generally compounds containing carboxyl groups, such as citric acid or nitrilotriacetic acid, but especially polymers containing carboxyl groups or salts of said polymers. These additives are referred to as cobuilders. Homopolymers of acrylic acid and copolymers of acrylic acid and maleic acid having molecular weights of about 30,000 to 120,000 have become commercially important in this context.

A process for the preparation of copolymers of acrylic, acid and maleic acid by free radical copolymerization in aqueous solution is disclosed in EP-A-0 075 820. Such a polymerization process in aqueous solution is particularly suitable for the preparation of detergent polymers, since the products are obtained in a form which is directly suitable for use in aqueous systems.

The incorporation of maleic acid, which is poorly polymerizable in aqueous solution, or of its alkali metal salt depends, inter alia, on the total degree of neutralization of the carboxylic acids during the polymerization. According to EP-A-0 075 820, this should expediently be 20 to 80%. Copolymers having a residual content of monomeric dicarboxylic acid of less than 1.5% are thus obtained.

According to Tenside Surfactants Detergents 24 (1987), pages 366 to 369, such copolymers, which are also referred to as polycarboxylates, undergo biodegradation only to a slight extent in wastewater treatment plants. Owing to the accumulation of polycarboxylates in the sewage sludge, there is ecological uncertainty with regard to the utilization of the sewage sludge when it is stored in landfills or during application to fields, and hence with regard to the final continued presence in the soil.

Increased biodegradability of these polycarboxylates when they are used as detergent additives is thus desirable.

In EP-A-0 497 611, terpolymers of 10 to 70 mol % of an unsaturated monocarboxylic acid, such as acrylic acid, 15 to 55 mol % of the anhydride of an unsaturated dicarboxylic acid, such as maleic anhydride, and 15 to 55 mol % of vinyl acetate, vinyl ether or vinylene carbonate are prepared. The products may then be partially hydrolysed, saponified and oxidized, terpolymers having improved biodegradability then being obtained.

Since the last-mentioned monomers are only slightly water-soluble, the polymerization is carried out in an organic solvent. Furthermore, disadvantages of the polymerization in an aqueous medium are pointed out in EP-A-0 497 611. Thus, incorporation of poorly water-soluble monomers is said to be possible only to a very limited extent. Vinyl acetate is partially converted into undesired acetaldehyde.

On the other hand, additional working-up steps must be accepted in the case of the polymerization in an organic medium: separation of the products obtained as precipitation polymers from the organic solvent phase, drying until the product is odourless, separate preparation of an aqueous, odourless solution of the terpolymers by subsequent saponification and, if required, oxidation.

Accordingly, a polymerization process which avoids the organic solvents is desirable here.

According to Houben-Weyl, Methoden der Organischen Chemie [Methods of Organic Chemistry], Volume 14/1, Makromolekulare Stoffe [Macromolecular Substances] I, 1961, pages 909 to 912, the homo- and copolymerization of vinyl acetate in aqueous solution is accompanied by partial hydrolysis to acetaldehyde, which has a regulatory or inhibitory effect in the course of the polymerization. It is also stated that hydrogen peroxide in concentrated form stabilizes vinyl acetate and thus delays the reaction. It is furthermore expedient to carry out the polymerization of vinyl acetate in a narrow pH range from 4 to 5 and at the boiling point of vinyl acetate (72° C.).

According to EP-A-0 075 820, the monomer mixture may also contain up to 20 percent by weight of vinyl acetate. However, with the aqueous solvent, the initiator hydrogen peroxide and the preferably set polymerization temperatures of 100° to 130° C, the polymerization conditions are not optimum for incorporation of vinyl acetate.

U.S. Pat. No. 3 887 480 describes the preparation of terpolymers of (meth)acrylic acid, maleic acid and vinyl acetate in an aqueous medium. The amount of vinyl acetate is said to be 20 to 45 mol %. In the polymerization, persulphate is used as a polymerization initiator in an unusually high concentration of more than 17 percent by weight, based on the total amount of the monomers. According to the examples, even an initiator concentration of about 30 percent by weight and a further large added mount of sodium bisulphite as an accelerator are generally required to maintain the polymerization under reflux conditions of the vinyl acetate.

The uneconomically large amounts of initiator required here are disadvantageous. Furthermore, only terpolymers having relatively low molecular weights of 500 to 30,000, in particular of 3000 to 15,000, are obtained. The preferred molecular weight range is below the range which has proved suitable and is desirable for scale-inhibiting polycarboxylate additives in phosphate-free detergents.

EP-A-0 398 724 claims the preparation of copolymers of 3 to 65 percent by weight of unsaturated dicarboxylic acids and 97 to 35 percent by weight of unsaturated monocarboxylic acids or unsaturated monomers free of carboxyl groups. In the examples, terpolymers of maleic acid, acrylic acid and small amounts of vinyl acetate are also prepared in the aqueous phase. All monomers, including initiator, are metered into hot water for the polymerization.

This process is disadvantageous for monomers which are not very reactive, such as maleic acid. Furthermore, relatively large amounts of initiator, preferably 0.5 to 20 percent by weight, and metal salt activators are required here.

It is therefore the object of the present invention to prepare, in an aqueous medium, with avoidance of large amounts of initiator and of metal salt activators, polymers which are readily biodegradable and are suitable for the detergent sector and in particular as cobuilders.

The object is achieved by initially introducing the dicarboxylic acid, its alkali metal salt or ammonium salt or mixtures of the dicarboxylic acid with its salts in the polymerization, metering in the monocarboxylic acid, its alkali metal salt or ammonium salt or mixtures of the monocarboxylic acid with its salts, either initially introducing or metering in or partly initially introducing and metering in the monomer containing no free carboxyl groups, and ensuring that 30 to 80 mol % of the mono- and the dicarboxylic acid together are neutralized, that is to say are present in salt form. According to the invention, the polymerization is carried out in the presence of surfactant compounds.

Suitable monoethylenically unsaturated dicarboxylic acids are, for example, maleic acid, fumaric acid, itaconic acid or mesaconic acid. It is also possible to use anhydrides which hydrolyse in the aqueous medium to give the associated dicarboxylic acids. Maleic acid or maleic anhydride is preferably used.

Examples of monoethylenically unsaturated monocarboxlic acids are acrylic acid, methacrylic acid, crotonic acid, vinylacetic acid, angelic acid and tiglic acid. Halfesters of the abovementioned dicarboxylic acids may also be used, and the ester alkyl radicals should have 2 to 4 C atoms. Acrylic acid and methacrylic acid are preferably used.

Suitable alkali metal salts are preferably the sodium and potassium salt. Ammonium salts are also understood as meaning salts of organic amines. Examples of such amines are trialkylamines whose alkyl groups have 1 to 4 C atoms, hydroxylamine or mono-, di- and trialkylamines whose alkyl chains contain 1 to 4 C atoms. In the preparation of the salts, it is also possible to start from mixtures of organic amines.

The mono- and dicarboxylic acids together are preferably used in an amount of 40 to 60 mol % in salt form for the polymerization.

The dicarboxylic acid may be used in the form of its salt and the monocarboxylic acid in free form Or partially neutralized, the dicarboxylic acid preferably being neutralized to a higher degree or at least to the same degree as the monocarboxylic acid. The use of the mono- and dicarboxylic acids with about the same degree of neutralization is particularly advantageous, in general a pH of 4 to 5 resulting in the polymerization medium.

For example, vinyl acetate, vinyl ether, vinylglycol, hydroxyethyl and hydroxypropyl acrylate, methyl (meth-)acrylate and vinylene carbonate may be used as the ethylenically unsaturated monomer containing no free carboxyl groups. However, a preferred monomer of this group is vinyl acetate.

These monomers, as component c, may be partially initially introduced and metered in. Thus, it may be advantageous to add 5 to 50% of component c together with a small amount of initiator immediately to the initially introduced dicarboxylic acid component a. It is also possible to preemulsify the water-soluble monomer b together with the less water-soluble monomer c in the presence of surfactants to give a stable monomer emulsion and to add the latter from a- metering vessel to the initially introduced dicarboxylic acid. This permits simplification of the process with a reduction in the number of metering streams.

Component a is used in an amount of, preferably, 20 to 50 percent by weight, component b is used in an amount of, preferably, 30 to 70 percent by weight and component c is used in an amount of, preferably, 20 to 40 percent by weight, based on the monomer mixture. In the case of components a and b, the stated amounts are based on the free di- or monocarboxylic acid respectively. Component c is used in particular in amounts of 21 to 35 percent by weight.

Suitable surfactant compounds are in particular anionic and nonionic surfactants, it also being possible to use mixtures of these surfactants.

The anionic surfactants include sodium alkylbenzenesulphonates, alkanesulphonates, fatty alcohol sulphates and fatty alcohol polyglycol ether sulphates. $C_8$- to $C_{12}$-alkylbenzenesulphonates, $C_{12}$- to $C_{16}$-alkanesulphonates, such as, for example, Na dodecanesulphoneate, $C_{12}$- to $C_{16}$-alkylsulphates, such as, for example, Na laurylsulphate, $C_{12}$- to $C_{16}$-alkylsulphosuccinates and sulphated ethoxylated $C_{12}$- to $C_{16}$-alkanols may be mentioned individually. Sulphated fatty alkanolamides, α-sulpho-fatty esters, fatty acid monoglycerides or reaction products of 1 to 4 mol of ethylene oxide with primary or secondary fatty alcohols or alkylphenols are also suitable. Furthermore, carboxymethylated reaction products of 3 to 20 mol of ethylene oxide with $C_{12}$- to $C_{16}$-fatty alcohols or $C_8$- to $C_{12}$-mono- or dialkylphenols and the phosphoric acid partial esters of ethoxylated $C_{12}$- to $Ch_{16}$-fatty alcohols are very suitable.

The predominantly water-soluble adducts of 3 to 40 mol of ethylene oxide with 1 mol of fatty alcohol, alkylphenol, fatty acid, fatty amine, fatty amide, alkanesulphonamide or sorbitan fatty esters having HLB values of 8 to 18 are suitable as nonionic low molecular weight surfactants. The adducts of 5 to 16 mol of ethylene oxide with coconut or tallow fatty alcohols, with oleyl alcohol, with synthetic alcohols having 8 to 18 C atoms and with mono- or dialkylphenols having 6 to 14 C atoms in the alkyl radicals are particularly suitable.

The ethoxylation products may optionally additionally contain up to 90 percent by weight of propylene oxide, based on the total content of alkylene oxide. The adducts which contain ethylene oxide and propylene oxide as condensed moieties may optionally be modified by additional incorporation of butylene oxide by condensation in amounts of up to 50 percent by weight, based on the total content of alkylene oxide.

The suitable nonionic surfactants furthermore include the alkylpolyglucosides modified with $C_4$- to $C_{18}$-alkyl groups and having a degree of oligomerization of 1 to 10 of the glucose units, and the water-soluble alkoxylation products obtainable by reacting the stated alkylpolyglucosides with ethylene oxide.

Suitable polymeric nonionic surfactant compounds are the water-soluble cellulose or starch derivatives obtainable by methylation, by alkoxylation with ethylene oxide or propylene oxide and by carboxymethylation, such as methylcellulose, hydroxyethyl- or hydroxypropylcellulose or carboxymethylcellulose.

Partially saponified polyvinyl acetates having a degree of saponification of 50 to 95% and graft polymers of vinyl acetate on polyethylene glycol are also suitable.

The surfactant compounds are generally used in added amounts of 0.1 to 5 percent by weight, in particular 0.5 to 2 percent by weight, based on the sum of the monomers. In the polymerization, they are preferably initially introduced together with the dicarboxylic acid.

The polymerization is preferably carried out in the presence of anionic or nonionic surfactants. Mixtures of these surfactants are also preferred.

Hydrogen peroxide, in added amounts of 0.5 to 5 percent by weight, based on the sum of the monomers, is preferably used as the free radical initiator. However, it is also possible to use sodium peroxodisulphate, potassium peroxodisulphate or ammonium peroxodisulphate, alone or together with hydrogen peroxide. It is advantageous to add a peroxodisulphate in a small amount of 0.2 to 2 percent by weight, based on the sum of the monomers, either to the initially introduced maleate or, after completion of the reaction, to the polymerization batch, and subsequently to heat the latter for a further 0.5 to 2 hours to reduce the residual monomer content.

It is also possible to add the regulators customary in free radical polymerizations in an aqueous medium, such as thioglycolic acid or mercaptoethanol, in amounts of 0.1 to 5 percent by weight, based on the sum of the monomers, and reducing additives which increase the rate of decomposition of the stated initiators, such as salts or complexes of heavy metals, such as, for example, copper, cobalt, manganese, iron, vanadium, nickel or chromium. Added amounts of 0.5 to 10 ppm, calculated as heavy metal, are sufficient. Iron traces in the stated ppm range may already have entered the reaction mixture by virtue of the fact that the reaction is carried out in an iron vessel. Furthermore, ascorbic acid, sodium sulphite, sodium bisulphite or sodium formaldehyde sulphoxylate (so-called rongalite) may be added, in amounts of 0.1 to 5 percent by weight, based on the sum of the monomers used.

After the end of the polymerization, the aqueous polymer mixture is as a rule rendered alkaline, generally at a pH of 7 to 9, due to application reasons.

In a particular embodiment of the invention, the ether and ester groups Of the polymers are saponified after the polymerization, after which an oxidative aftertreatment which reduces the molecular weight is also generally carried out.

For saponification of the ether and ester groups, the polymerization batch is adjusted to a pH of 9 to 11 by the addition of alkali and then heated at 30° to 120° C., preferably at 50° to 100° C., for 0.5 to 7 hours, and then adjusted to a pH of 7 to 9 after the addition of an organic acid, such as acetic acid, or of a mineral acid, such as sulphuric acid.

In order to improve the properties of the terpolymers for use in detergents, it may be advantageous in some cases subsequently to subject the neutralized or saponified terpolymer solutions to an oxidative treatment. For this purpose, the terpolymer solutions are heated for 0.5 to 2 hours at 30° to 120° C., preferably at 50° to 80° C., after the addition of 1 to 20 percent by weight, preferably 1 to 10 percent by weight, based on the solids content, of an oxidizing agent, such as $H_2O_2$, tert-butyl hydroperoxide or chlorine bleaching liquor. As a result of the oxidative treatment, the K value and the molecular weight of the terpolymers are reduced and hence the dispersing power for hydrophilic dirt particles—this is a measure of the dirt-carrying power—is increased.

The polymer solutions obtained by neutralization and optionally by saponification and oxidative treatment can be used immediately as detergent additives, and they are combined directly with other aqueous solutions containing detergent components and are subjected to the customary spray processes. However, the polymer solutions may also be isolated in dry powder form by evaporating down the solutions and may be incorporated in pulverulent detergents.

The present preparation process makes it possible to work in the aqueous phase. There is no necessity for large amounts of initiators and for activators, and large amounts of poorly water-soluble monomers may be polymerized.

Compared wit the copolymers disclosed in EP-A-0 075 820, the terpolymers prepared according to the invention have an equally good scale-inhibiting action when used as cobuilders in low-phosphate or phosphate-free detergents and cleaning agents and moreover have an increased biodegradability of 70 to 100%.

In a first step in the polymerization, an aqueous solution of the dicarboxylic acid a or of its salt is usually initially introduced. Thereafter, the monocarboxylic acid b or its salt, the initiator, expediently likewise in aqueous solution, and the poorly water-soluble monomer c are added in the course of 3 to 10 hours, with separate metering. The polymerization temperature is generally between 80° and 150° C., preferably between 90° and 120° C. Pressure-resistant vessels, such as autoclaves, which may be equipped with an anchor stirrer, paddle stirrer, impeller stirrer or multistage impulse countercurrent agitator, are chosen as the reaction vessel, provided that the polymerization temperature exceeds the boiling point of the monomer c.

The process according to the invention is carried out in the presence of surfactants, the course corresponds to a solution polymerization.

The terpolymerization process according to the invention in the presence of surfactants surprisingly leads to increased, generally complete, transparency of the saponified polymer solutions. In addition, the incorporation of the poorly water-soluble termonomer is accelerated, the hydrolysis of vinyl acetate to acetaldehyde is suppressed and the residual content of monomeric mono- and dicarboxylic acids is reduced.

EXAMPLES

General method for the preparation of terpolymers of maleic acid, acrylic acid and vinyl acetate In a stainless steel reactor equipped with an anchor stirrer, a manometer, three metering lines including metering pumps, nitrogen and vacuum lines and having a heating jacket, maleic anhydride in demineralized water is initially introduced, dissolved while stirring at 50° C. and partially neutralized with 50% strength sodium hydroxide solution, the temperature of the reactor content increasing to about 80° C. The reactor is alternately flushed three times with nitrogen at 3 bar (=$3 \times 10^5$ Pa) and evacuated. Heating is then carried out to the reaction temperature.

Process variant I

The surfactant is added to the initially introduced maleate with stirring. Thereafter, from three separate metering lines, a) acrylic acid which is diluted with the stated amount of water and may be partially neutralized with 50% strength sodium hydroxide solution is uniformly metered into the initially introduced maleate in the course of 4 hours, b) vinyl acetate in undiluted form in the course of 4 hours and c) an initiator solution in the course of 4.5 hours.

Process variant II

A surfactant-containing monomer mixture comprising acrylic acid, which is diluted with water and partially neutralized with 50% strength sodium hydroxide solution, vinyl acetate and the surfactant is prepared with stirring. This emulsion is metered from a metering vessel uniformly into the initially introduced maleate in the course of 4 hours, and an initiator solution in the course of 4.5 hours.

In both process variants, heating is continued for a further 2 hours at 100° C. after the end of the monomer feed. The polymer solutions obtained are cooled, let down to atmospheric pressure and worked up as follows:

Working up A

Neutralization 100 g of polymer solution obtained are diluted with 100 g of demineralized water and adjusted to a pH of 7.5 with 50% strength sodium hydroxide solution at room temperature.

Working up B
Neutralization and saponification

The neutralized polymer solution obtained by method A is mixed with further 50% strength sodiumhydroxide solution until a pH of 11 is reached. Refluxing is then carried out for 5 hours. Thereafter, cooling is effected and a pH of 7.5 is established by adding acetic acid.

Working up C
Neutralization, saponification and oxidation

After the addition of 4 g of 30% strength hydrogen peroxide solution, 100 g of the saponified polymer solution obtained by method B are refluxed for 3 hours until residual peroxide is no longer detectable by means of a peroxide test strip The following investigations are carried out on the polymer solutions:

1. Molecular weights, determined by gel permeation chromatography.
2. K values according to Fikentscher, Cellulosechemie [Cellulose Chemistry] 13, 1932, page 60, determined in 1% strength solution in water at 25° C.
3. Residual monomer content of free maleic acid, acrylic acid and vinyl acetate, determined by high-pressure liquid chromatography.
4. Total aldehyde content by addition reaction with Na bisulphite. Here, the insoluble adduct is formed. After elimination of excess bisulphite by the addition of iodine and liberation of the aldehyde contained in the bisulphite adduct, the content is determined by addition of sodium bicarbonate and quantitative iodine titration.
5. Calcium carbonate dispersing capacity (CCDC) in mg of $CaCO_3$/g according to Richter-Winkler, Tenside Surfactants Detergents 24 (1987), No. 4, page. 213: turbidity titration using an automatic titration apparatus (Mettler DL 25 with photoelectrode). The CCDC value is a measure of the scale-inhibiting action.
6. Extinction E at 450 nm of a 1 cm layer of an $Fe_2O_3$ suspension (40 g/l) in an aqueous solution of the test substance (10 g/l) after a settling time of 24 hours. A high extinction indicates high turbidity and hence good dispersing of suspending power for hydrophilic dirt particles.
7. Interfacial tension in mN/m of a 0.5% strength polymer solution compared with liquid paraffin at 25° C.

Preparation of terpolymers of acrylic acid, maleic anhydride and vinyl acetate using the starting materials in a ratio of 54.3: 23.5: 22.2 percent by weight Comparative Example A (without addition of surfactant, variant I)

In the reactor, 250 g of maleic anhydride are dissolved in 600 g of water and neutralized to an extent of 50% with 205 g of 50% strength sodium hydroxide solution. At a polymerization temperature of 105° C., a) a 50% neutralized acrylic acid solution comprising 578 g of acrylic acid, 400 g of water and 321 g of 50% strength sodium hydroxide solution,
b) 237 g of vinyl acetate and
c) an initiator solution comprising 40 g of Na peroxodisulphate and 150 g of water are metered in. After neutralization of the polymer solution obtained, a pale brown, turbid, pungent solution having a solids content of 26 percent by weight results.

Example 1

(Variant I)

The procedure is as in Comparative Example A. However, 60 g of a 20% strength Na dodecanesulphonate solution (MERSOLAT® K 30, Bayer AG, D-51368 Leverkusen) are added to the initially introduced maleate. After neutralization, a pale yellow, clear polymer solution having scarcely any odour and a solids content of 26 percent by weight results.

Example 2

(Variant I)

The procedure is as in Comparative Example A. However, 25 g of a $C_{12}$–$C_{14}$-fatty alcohol polyglycol ether (MARLIPAL® 1217, Hüls AG, D-45764 Marl) are added to the initially introduced maleate. After neutralization, the polymer solution obtained has a pale yellow colour, a transparent appearance and only a weak odour.

Example 3

(Variant I)

The procedure is as in Comparative Example A. However, 25 g of a polyoxyethylene sorbitan dodecanoic acid ester (TWEEN® 20, Atlas, Wilmington, Del., USA) are added to the initially introduced maleate. The neutralized end product corresponds to a product of Example 2 with regard to pale colour, clarity and weak odour.

Example 4

(Variant I)

The procedure is as in Comparative Example A. However, 25 g of a 88% saponified polyvinyl acetate (POVAL® 220 E, Kuraray) are added to the initially introduced maleate. The neutralized polymer solution is pale yellow and has little odour.

Example 5

(Variant I)

The procedure is as in Comparative Example A. However, 12 g (calculated as solid product) of a carboxymethylated $C_{12}$–$C_{14}$-fatty alcohol polyethylene glycol ether (MARLINAT® CM 100, Hüls AG) are added to the initially introduced maleate. A pale, clear, neutralized polymer solution having little odour results.

The product properties of the neutralized terpolymer solutions are evident from the table below.

TABLE 1

| Example | Residual monomers (ppm) | | | Molecular weight $M_w$ | CCDC mg $CaCO_3$/g |
|---|---|---|---|---|---|
| | MA | AA | Aldehydes | | |
| A | 4290 | 400 | 420 | 56,800 | 144 |
| 1 | <100 | 254 | 380 | 65,200 | 175 |
| 2 | <100 | 128 | 400 | 70,100 | 183 |
| 3 | 140 | 60 | 310 | 84,000 | 185 |
| 4 | 160 | 90 | 170 | 67,000 | 154 |
| 5 | 400 | 180 | 240 | 63,000 | 156 |

TABLE 1-continued

|  | Residual monomers (ppm) | | | Molecular weight | CCDC mg |
| --- | --- | --- | --- | --- | --- |
| Example | MA | AA | Aldehydes | $M_w$ | CaCO$_3$/g |

MA = Maleic acid
AA = Acrylic acid

These results show quantitatively the advantageous effect of the surfactant addition according to the invention in the terpolymerization on the residual monomer content and the CCDC. The neutralized polymer solutions obtained according to Comparative Example A and Examples 1 and 2 are also worked up by methods B and C. A decrease in molecular weight takes place (cf. Table 2).

TABLE 2

| Example | Working up | CCDC mg CaCO$_3$/g | Extinction E | Interfacial tension N/m | K value |
| --- | --- | --- | --- | --- | --- |
| A | A | 144 | <10 | 27.5 | 35 |
|   | B | 142 | <10 | 28.5 | 32 |
|   | C | 143 | 30 | 31.0 | 28 |
| 1 | A | 175 | <10 | 9.0 | 46 |
|   | B | 161 | <10 | 11.5 | 41 |
|   | C | 160 | 40 | 26.5 | 27 |
| 2 | A | 183 | <10 | 9.5 | 51 |
|   | B | 181 | <10 | 18.0 | 48 |
|   | C | 155 | 45 | 19.5 | 26 |

The results show that, in comparison with the comparative experiment, the terpolymer solutions prepared according to the examples of the invention show not only an increased CCDC but also a lower interfacial tension and hence better suitability as detergent additives, even with different aftertreatment. Furthermore, the dirt-carrying power is also improved by the oxidative after-treatment.

Preparation of terpolymers of acrylic acid, maleic anhydride and vinyl acetate using the starting materials in a ratio of 46.6: 31.1: 22.3 percent by weight Comparative Example B (without addition of surfactant)

330 g of maleic anhydride, dissolved in 700 g of water and neutralized with 270 g of 50% strength sodium-hydroxide solution, and 199 g of vinyl acetate (50% of the total amount) are initially introduced into the reactor. Thereafter, a) a 50% neutralized acrylic acid solution, prepared from 495 g of acrylic acid, 300 g of water and 275 g of 50% strength sodium hydroxide solution, b) 119 g of vinyl acetate and c) an initiator solution comprising 150 g of 30% strength hydrogen peroxide and 100 g of water are metered in from separate metering lines at a polymerization temperature of 105° C.

Example 6

The procedure is as in Comparative Example B. However, 60 g of a 20% strength Na dodecanesulphonate solution (MERSOLAT® K 30) are added to the initially introduced maleate.

Example 7

The procedure is as in Example 6. However, the addition of the vinyl acetate is carried out in a manner such that 60 g (25% of the total amount) are used in the initially introduced maleate and 178 g (75% of the total amount) are metered in.

After working up according to method B, polymer solutions having the following properties are obtained:

TABLE 3

|  | Residual monomers (ppm) | | | Molecular weight | CCDC mg |
| --- | --- | --- | --- | --- | --- |
| Example | MA | AA | Aldehydes | $M_w$ | CaCO$_3$/g |
| B | 4500 | 600 | 640 | 20,700 | 168 |
| 6 | 400 | 500 | 560 | 28,200 | 167 |
| 7 | 214 | 180 | 110 | 24,000 | 168 |

MA = Maleic acid
AA = Acrylic acid

The measured values show the advantageous effect of the surfactant addition according to the invention in the polymerization on the residual monomer content.

Preparation of terpolymers of acrylic acid, maleic anhydride and vinyl acetate using the starting materials in a ratio of 42.4: 35.5: 22.1 percent by weight Comparative Example C (without addition of surfactant, variant II)

An initially introduced maleate mixture is prepared from 380 g of maleic anhydride, 700 g of water and 310 g of 50% strength sodium hydroxide solution and is heated to 105° C. Thereafter, a monomer emulsion comprising 237 g of vinyl acetate and 455 g of acrylic acid, which is diluted with 300 g of water and partially neutralized with 253 g of 50% strength sodium hydroxide solution, and an initiator solution comprising 150 g of 30% strength hydrogen peroxide and 100 g of water are metered. In the course of the polymerization, the internal reactor pressure increases to 2.3 bar after 1 hour, to 3.5 bar after 2 hours and to 4 bar after 3 hours. A yellow turbid, pungent polymer solution having a solids content of 46%, a K value of 26, an aldehyde content of 0.7% and a CCDC of 253 mg CaCO$_3$/g results.

Example 8

(Variant II)

With regard to carrying out the polymerization, the procedure is as in Comparative Example C. However, 22 g, calculated as solid product, of a carboxymethylated C$_{13}$-fatty alcohol polyethylene glycol ether (MARLOWET® 4538, Hüls AG) are metered together with the acrylate/vinyl acetate monomer emulsion. During the polymerization, the internal reactor pressure increases to 1.9 bar after 1 hour, to 3.1 bar after 2 hours and to 3.8 bar after 3 hours. A pale yellow, clear polymer solution having a solids content of 45%, a K value of 27, an aldehyde content of 0.22% and a CCDC of 290 mg CaCO$_3$/g is obtained.

In Example 8 according to the invention, the pressure thus increases to a smaller extent than in Comparative Example C. This result indicates a higher rate of reaction.

We claim:

1. Process for the preparation of terpolymers by free radical polymerization in an aqueous medium, the component a, a monoethylenically unsaturated $C_4$- to $C_6$-dicarboxylic acid, its alkali metal salt and/or its ammonium salt, being initially introduced, the component b, a monoethylenically unsaturated $C_3$- to $C_5$-monocarboxylic acid, its alkali metal salt and/or its ammonium salt, being metered in, the component c, an ethylenically unsaturated monomer containing no free carboxyl groups, being initially introduced and/or metered in, and 30 to 80 mol % of components a and b together being present in salt form, characterized in that the polymerization is carried out in the presence of surfactant compounds.

2. Process according to claim 1, characterized in that 20 to 50 percent by weight of component a, 30 to 70 percent by weight of component b and 5 to 40 percent by weight of component c are used.

3. Process according to claim 2, characterized in that 10 to 35 percent by weight of component c are used.

4. Process according to claim 1, characterized in that the dicarboxylic acid is maleic acid, the monocarboxylic acid is (meth)acrylic acid and the monomer containing no free carboxyl groups is vinyl acetate.

5. Process according to claim 1, characterized in that 40 to 60 mol % of components a and b together are present in salt form.

6. Process according to claim 1, characterized in that the polymerization is carried out in the presence of anionic and/or nonionic surfactants.

7. Process according to claim 1, characterized in that polymerization is carried out in the presence of 0.1 to 5 percent by weight, based on the sum of the monomers, of surfactant compounds.

8. Process according to claim 1, characterized in that, after the polymerization, the terpolymer is subjected to saponification or to saponification and an oxidative aftertreatment.

9. Process according to claim 1, characterized in that 20 to 30 percent by weight of component c are used.

10. Process according to claim 1, characterized in that polymerization is carried out in the presence of 0.5 to 2 percent by weight, based on the sum of the monomers, of surfactant compounds.

* * * * *